UNITED STATES PATENT OFFICE.

ZDENKO METZL, OF ROUEN, FRANCE.

PROCESS FOR THE REDUCTION OF STANNIC OXID.

1,053,624. Specification of Letters Patent. Patented Feb. 18, 1913.

No Drawing. Application filed March 16, 1912. Serial No. 684,334.

*To all whom it may concern:*

Be it known that I, ZDENKO METZL, a subject of the Emperor of Austria-Hungary, residing at Rouen, in the Department of Seine-Inferieure, France, have invented certain new and usful Improvements in Processes for the Reduction of Stannic Oxid, of which the following is a specification.

The production of metallic tin from stannic oxid is mainly done in the trade by the dry process. The wet process is only employed for removing deleterious constituents of the tin ore. Attempts at carrying out a technically effective reduction of stannic oxid by electro-metallurgical means have hitherto yielded no practical result.

The dry method is based on the capability of reducing tin oxid by carbon and carbonic oxid at high temperatures. Before the tin can be smelted out the tin ore (tin stone, cassiterite) must be purified by mechanical treatment and by chemical means (roasting and treating with acids), in order to prevent the subsequent formation of alloys with metallic impurities and clinkering with silicates and earth bases. The reduction of the tin oxid by means of carbon and carbonic oxids requires a very high temperature and considerable time, whereby considerable cost in fuel is involved. In addition the reduction is never a complete one and therefore is always connected with losses of material.

This invention has for its object the production of metallic tin by a reductive smelting with metallic zinc alone or mixed with other wellknown reducing agents. The preparatory purification of the tin ore for the reduction process is retained, but instead of carbon or carbonic oxid metallic zinc is employed as reducing medium, in consequence of the hitherto unknown circumstance that stannic oxid is rapidly and quantitatively reduced by metallic zinc.

The principal advantage of the process consists in time and material being saved by the rapid and quantitative reduction, as it offers no difficulties to arrange the apparatus even on a large scale in such a way that losses of the reducing medium and of the final product are avoided.

Metallic zinc is melted as far as possible under exclusion of air or in a reducing atmosphere and the stannic oxid is introduced into the bath of zinc, the reduction taken place according to the following formula:

$$SnO_2 + 2Zn = Sn + 2ZnO.$$

The reducing smelting may be carried out in crucibles or in tubular, muffle, reverberatory or shaft furnaces, the resulting oxid of zinc being volatilized and again reduced to zinc by means of carbon in a manner well known in the smelting industry, which zinc may again be employed for reducing fresh quantities of stannic oxid.

Any solid or gaseous material may be employed as fuel for the reduction, so far as they partially assist the reduction process.

The recovery of the metallic tin may also be done by igniting a mixture of stannic oxid and metallic zinc in a pulverulent form or in shavings and with or without the addition of an igniting compound, after the manner of Goldschmidt's thermit process and in this way starting the desired reaction and reduction.

What I claim is:—

1. A process of reducing tin oxid to metallic tin, which comprises reacting upon the tin oxid with metallic zinc at a temperature at least as high as the melting point of metallic zinc.

2. A process of reducing tin oxid to metallic tin, which comprises reacting upon the tin oxid with metallic zinc at a temperature at least as high as the melting point of metallic zinc, then volatilizing the zinc oxid, treating the same with a reducing agent, at a temperature capable of reducing the same to metallic zinc, and treating such zinc with tin oxid.

3. A process of reducing tin oxid which comprises mixing together tin oxid and metallic zinc, in about the proportions expressed by the reaction $$SnO_2 + 2Zn = Sn + 2ZnO,$$

then heating a small part of the mixture to a temperature capable of causing the said reaction to take place, whereby the reaction will propagate itself throughout the entire mass of material.

In testimony whereof I affix my signature in presence of two witnesses.

ZDENKO METZL.

Witnesses:
 CHARLES THORN,
 MAURICE D'ANJOU.